(12) United States Patent
Ichikawa et al.

(10) Patent No.: US 12,523,303 B2
(45) Date of Patent: Jan. 13, 2026

(54) SEALING STRUCTURE

(71) Applicant: NOK CORPORATION, Tokyo (JP)

(72) Inventors: Hiromasa Ichikawa, Kumamoto (JP); Eizo Hayashi, Kumamoto (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 18/706,544

(22) PCT Filed: Oct. 31, 2022

(86) PCT No.: PCT/JP2022/040774
§ 371 (c)(1),
(2) Date: May 1, 2024

(87) PCT Pub. No.: WO2023/085164
PCT Pub. Date: May 19, 2023

(65) Prior Publication Data
US 2025/0012362 A1    Jan. 9, 2025

(30) Foreign Application Priority Data

Nov. 12, 2021 (JP) .................................. 2021-184846

(51) Int. Cl.
*F16J 15/32* (2016.01)
*F16J 15/16* (2006.01)
*F16J 15/3284* (2016.01)

(52) U.S. Cl.
CPC ......... *F16J 15/3284* (2013.01); *F16J 15/166* (2013.01)

(58) Field of Classification Search
CPC .. F16J 15/16; F16J 15/166; F16J 15/32; F16J 15/3284
See application file for complete search history.

(56) References Cited

U.S. PATENT DOCUMENTS 7,900,934 B2 * 3/2011 Kanagae ................ F16J 15/166
                                                                277/584
9,777,839 B2 * 10/2017 Monma .................. F16J 15/166
(Continued)

FOREIGN PATENT DOCUMENTS

JP          9-222058        8/1997
JP          11-72162        3/1999
(Continued)

OTHER PUBLICATIONS

International Search Report issued in International Patent Application No. PCT/2022/040774, dated Dec. 6, 2022.
(Continued)

*Primary Examiner* — Christine M Mills
*Assistant Examiner* — L. Susmitha Koneru
(74) *Attorney, Agent, or Firm* — GREENBLUM & BERNSTEIN, P.L.C.

(57) ABSTRACT

A sealing structure having a circular pillar-shaped shaft that has an annular groove, which is continuous in a circumferential direction, on an outer circumferential surface, a housing having a shaft hole into which the shaft is inserted, a seal ring which seals a gap between the shaft and the housing, and a backup ring disposed on the low-pressure side of the seal ring inside the annular groove, wherein: there is a tapered surface α on the low-pressure side of the groove bottom of the annular groove; a taper angle $\theta_\alpha$ is 15° to 50°; the backup ring has a tapered surface β; and a taper angle $\theta_\beta$ is larger than the taper angle $\theta_\alpha$.

4 Claims, 7 Drawing Sheets

(56) References Cited

U.S. PATENT DOCUMENTS

| | | | |
|---|---|---|---|
| 10,107,401 B2* | 10/2018 | Monma | F16J 15/3284 |
| 2008/0018059 A1* | 1/2008 | Otuka | F16J 15/322 |
| | | | 277/650 |
| 2009/0121443 A1* | 5/2009 | Kanagae | F16J 15/166 |
| | | | 277/584 |
| 2011/0021723 A1* | 1/2011 | Yanagisawa | C08G 77/08 |
| | | | 525/477 |
| 2013/0069362 A1* | 3/2013 | Miura | F16J 15/166 |
| | | | 285/202 |
| 2017/0097094 A1* | 4/2017 | Monma | F16J 15/166 |
| 2017/0292607 A1* | 10/2017 | Monma | F16J 15/3416 |
| 2020/0232563 A1* | 7/2020 | Nobori | F16J 15/104 |

FOREIGN PATENT DOCUMENTS

| | | |
|---|---|---|
| JP | 11-315925 | 11/1999 |
| JP | 2011-7214 | 1/2011 |
| JP | 2011-21723 | 2/2011 |
| JP | 2014-114878 | 6/2014 |
| JP | 2015-218205 | 12/2015 |
| JP | 2017-75703 | 4/2017 |

OTHER PUBLICATIONS

Written Opinion issued in International Patent Application No. PCT/2022/040774, dated Dec. 6, 2022.
Decision of Refusal issued in JP Patent Application No. 2023-559577 mailed on Jan. 14, 2025, and English language translation thereof.

\* cited by examiner

SEALING STRUCTURE

TECHNICAL FIELD

The present invention relates to a sealing structure.

BACKGROUND ART

Figure 5:
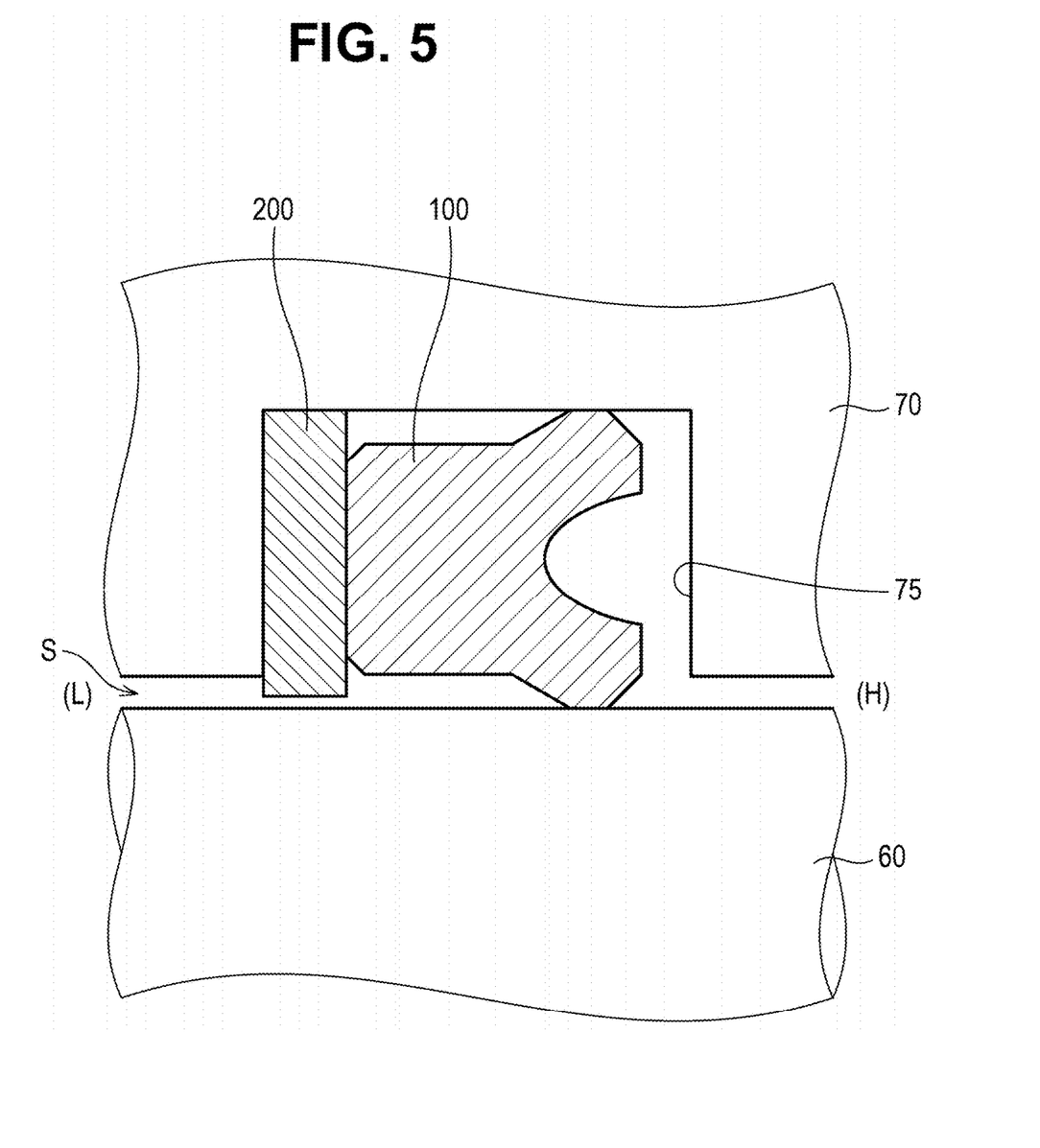
FIG. 5 is a schematic cross-sectional view of a conventional sealing structure in a state in which the pressure difference between the high pressure side (H) and the low pressure side (L) is zero or small.
Figure 6:
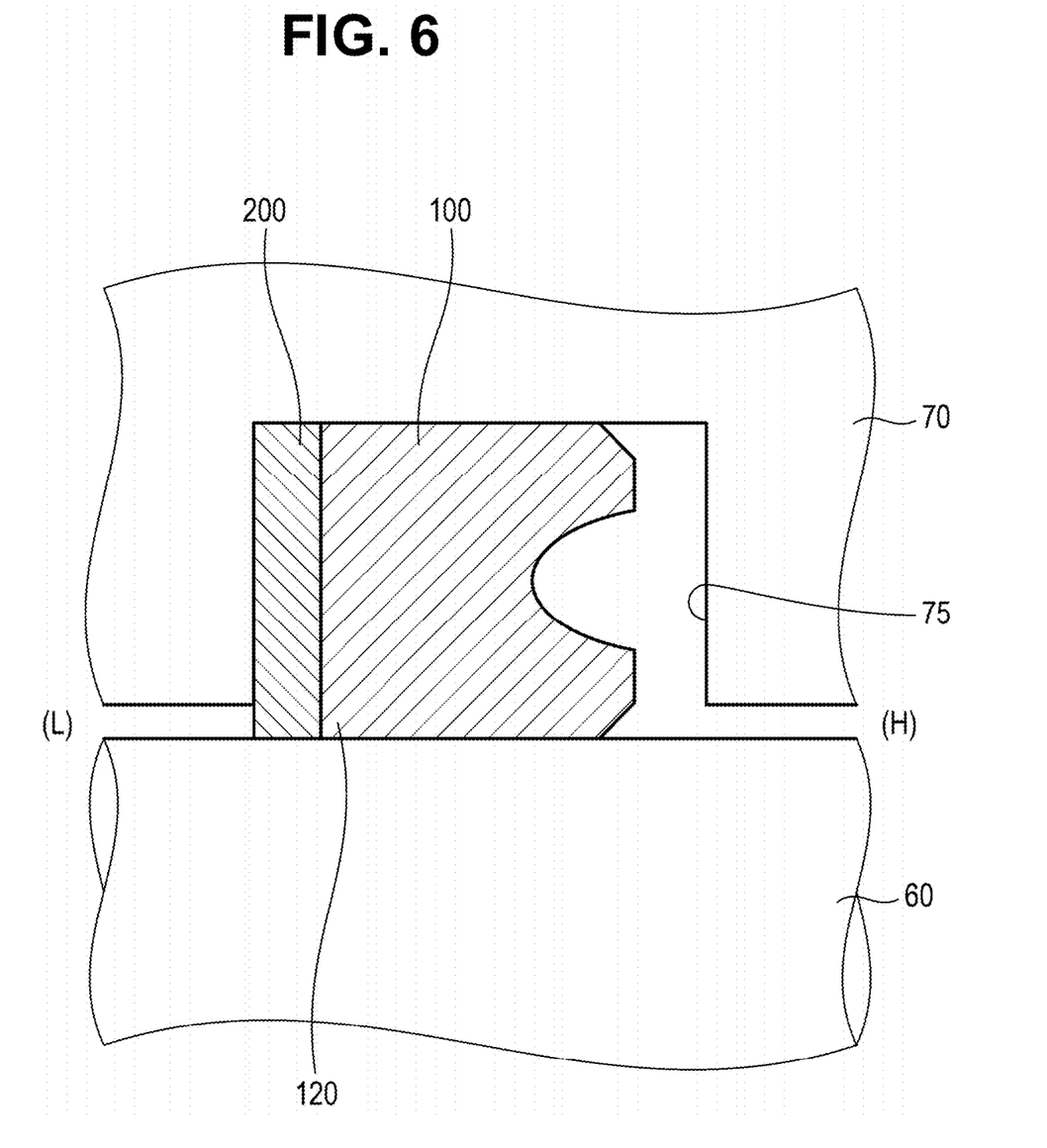
FIG. 6 is a schematic cross-sectional view of the conventional sealing structure in a state in which the pressure difference between the high pressure side (H) and the low pressure side (L) is large.
Figure 7:
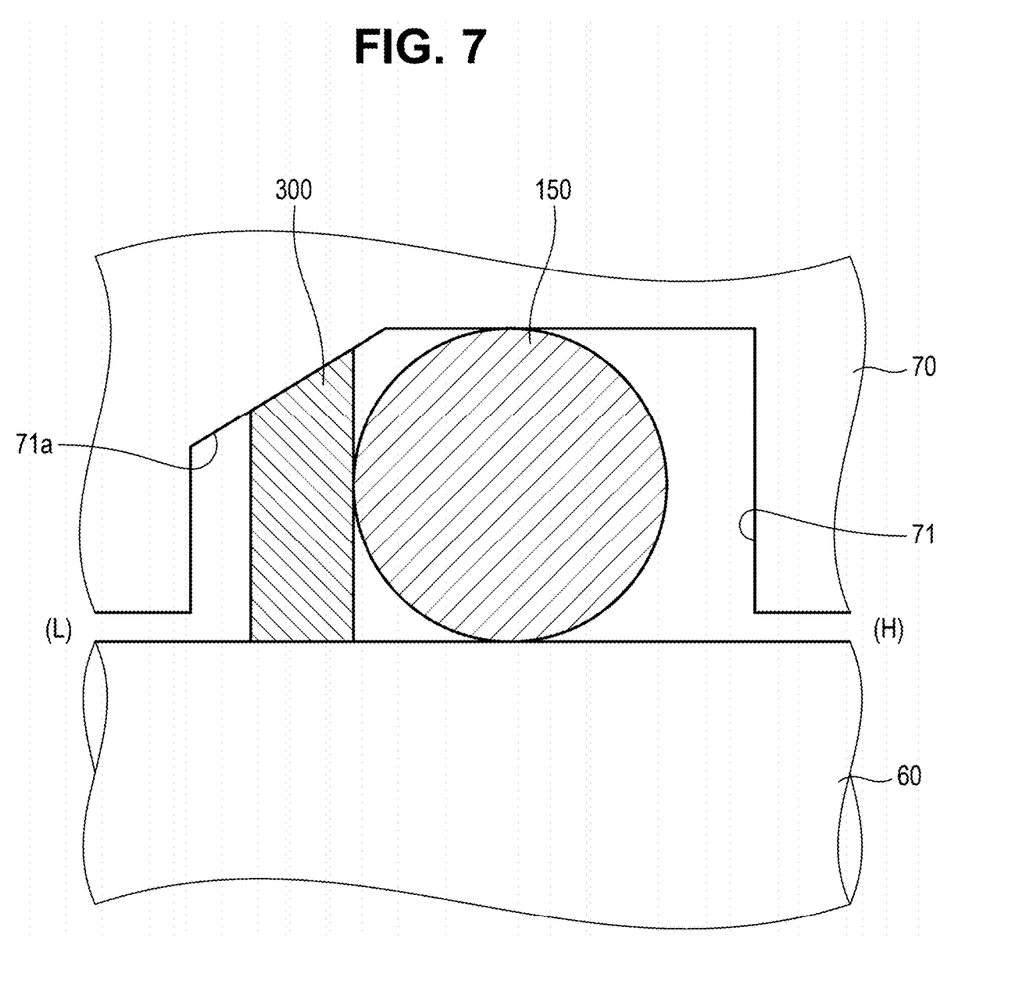
FIG. 7 is a schematic cross-sectional view of another conventional sealing structure.

A conventional sealing structure is described using FIG. 5 to FIG. 7.

FIG. 5 and FIG. 6 are schematic cross-sectional views of the conventional sealing structure. FIG. 5 shows a state in which the pressure difference between the high pressure side (H) and the low pressure side (L) is zero or small; and FIG. 6 shows a state in which the pressure difference therebetween is large. In this sealing structure, a sealing ring 100 is disposed in an annular groove 75 provided in a shaft hole inner peripheral surface of a housing 70 to seal an annular gap between a shaft 60 and the housing 70. On the lower pressure side (L) of the sealing ring 100 in the annular groove 75, a backup ring 200 is disposed next to the sealing ring 100. This backup ring 200 is provided to prevent an inner peripheral edge 120 of the sealing ring 100 from protruding into a tiny gap between the shaft 60 and the housing 70.

In terms of the ease of attachment and dimensional tolerance, the backup ring 200 is configured so that a gap S is formed with respect to the shaft 60 in a state in which an external force does not act as shown in FIG. 5. Then, when the pressure difference between the high pressure side (H) and the lower pressure side (L) is increased as shown in FIG. 6, the backup ring 200 is compressed between the sealing ring 100 and a lateral wall surface of the annular groove 75 to be radially extended and deformed. The gap between the backup ring 200 and the shaft 60 is thus eliminated to suppress protrusion of the inner peripheral edge of the sealing ring 100.

Another technique is also known in which a gap is prevented from occurring between a shaft and a backup ring at all times by sliding the backup ring with respect to the shaft instead of eliminating the gap between the shaft and the backup ring making use of elastic deformation of the backup ring. FIG. 7 is a schematic cross-sectional view of another conventional sealing structure. In this conventional example, a groove bottom surface of an annular groove 71 provided in a shaft hole inner peripheral surface of a housing 70 has, on its low pressure side, a tapered surface 71a in which the diameter is reduced from the high pressure side (H) toward the low pressure side (L). Then, an outer peripheral surface of a backup ring 300 which is disposed on the low pressure side (L) so as to be adjacent to a sealing ring 150 is also configured by a tapered surface in which the diameter is reduced from the high pressure side (H) toward the low pressure side (L). The taper angle of the tapered surface 71a on the annular groove 71 side is configured to be equal to that of the outer peripheral surface of the backup ring 300.

As long as there is a pressure difference between the high pressure side (H) and the low pressure side (L), the backup ring 300 is kept pressed on the low pressure side (L) owing to such a configuration, and the state in which there is no gap between the backup ring 300 and a shaft 60 is therefore maintained. Further, according to this conventional example, even in a case where the distance between the shaft 60 and the housing 70 (its shaft hole) is changed due to eccentricity of the shaft 60, a gap can be prevented from occurring between the backup ring 300 and the shaft 60 by pressing the backup ring 300 on the low pressure side (L).

Regarding the conventional sealing structures, in addition to the above, there are techniques described in, for example, Patent Documents 1 to 3.

CITATION LIST

Patent Documents

Patent Document 1: JP 11-315925 A
Patent Document 2: JP 09-222058 A
Patent Document 3: JP 11-072162 A

SUMMARY OF THE INVENTION

Problem to be Solved by the Invention

It is desirable for the above-described sealing structures to have higher sealing performance. An object of the present invention is to provide a sealing structure having high sealing performance.

Means for Solving the Problem

The inventors of the present invention have made an intensive study to solve the problem described above and completed the present invention.

The present invention provides the following (1) and (2).
(1) A sealed structure including:
   a column-shaped shaft having a circumferentially continuing annular groove in its outer peripheral surface;
   a housing having a shaft hole through which the shaft is inserted;
   a sealing ring made of elastic rubber which is disposed within the annular groove and is configured to seal a gap between the shaft and the housing in the shaft hole; and
   a backup ring made of a hard material which is disposed on a low pressure side of the sealing ring within the annular groove and is configured to prevent the sealing ring from protruding out of the annular groove due to pressure from a high pressure side;
wherein:
   a groove bottom of the annular groove has, on its low pressure side, a tapered surface $\alpha$ where a distance to the housing is gradually reduced from the high pressure side toward the low pressure side, and the tapered surface $\alpha$ has a taper angle $\theta_\alpha$ of 15° to 50°,
   the backup ring has a tapered surface $\beta$ which faces the tapered surface $\alpha$, a taper angle $\theta_\beta$ of the tapered surface $\beta$ is larger than the taper angle $\theta_\alpha$, and an annular edge portion on the high pressure side of the tapered surface $\beta$ is configured to be slidable in a state of line contact with the tapered surface $\alpha$, and
   when in a cross-section through which an axis $\omega_\alpha$ of the shaft passes, a length of the backup ring in a direction parallel to the axis $\omega_\alpha$ is denoted by La, a length in a direction perpendicular thereto is denoted by Lb, a length of the tapered surface $\alpha$ in the annular groove in a direction parallel to the axis $\omega_\alpha$ is denoted by Lc, and a distance between the groove bottom of the annular groove and the housing is denoted by Ld, following formulas are satisfied:

$La \geq 0.5$ mm, $La/Lb > \frac{1}{2}$, $Ld > Lb$, and $Ld - \{(Lc - La)/\tan(90° - \theta_\alpha)\} \leq Lb$.

(2) The sealing structure according to (1) above, wherein an internal diameter of the backup ring is larger than a cross-sectional diameter up to the groove bottom of the annular groove (limited to a portion except the tapered surface α).

Effect of the Invention

The present invention can provide a sealing structure having high sealing performance.

DESCRIPTION OF EMBODIMENTS

The sealing structure of the invention is a structure including a shaft and a housing, and configured to seal a gap therebetween with a sealing ring. The shaft and the housing may relatively move (by at least one of rotation and reciprocation) or be both static.

The shaft and the housing are in principle disposed so that a cross-section perpendicular to the longitudinal direction of the shaft and a cross-section perpendicular to the longitudinal direction of a shaft hole of the housing form concentric circles. However, eccentricity may occur due to relative movement of the shaft and the housing. The gap between the shaft and the housing can be sealed even if such eccentricity occurs.

In the sealing structure of the invention, one side of the shaft in its longitudinal direction is high pressure side (High) and the other side is low pressure side (Low). However, a state in which there is no pressure difference between both sides may be included.

The high pressure side (High) may be sealed with high pressure fluid such as gas or liquid, whereas the low pressure side (Low) may be sealed with atmospheric air. Alternatively, both sides may be sealed with fluid.

Examples to which the sealing structure of the invention as described above is preferably applicable may include sealing portions of high pressure hydrogen tanks or piping in fuel cells, injector portions in direct injection engines, cylinders for use in constructing machines, cylinders for use in general machines, and shock absorbers.

The sealing structure of the invention is described using drawings.

Figure 1:
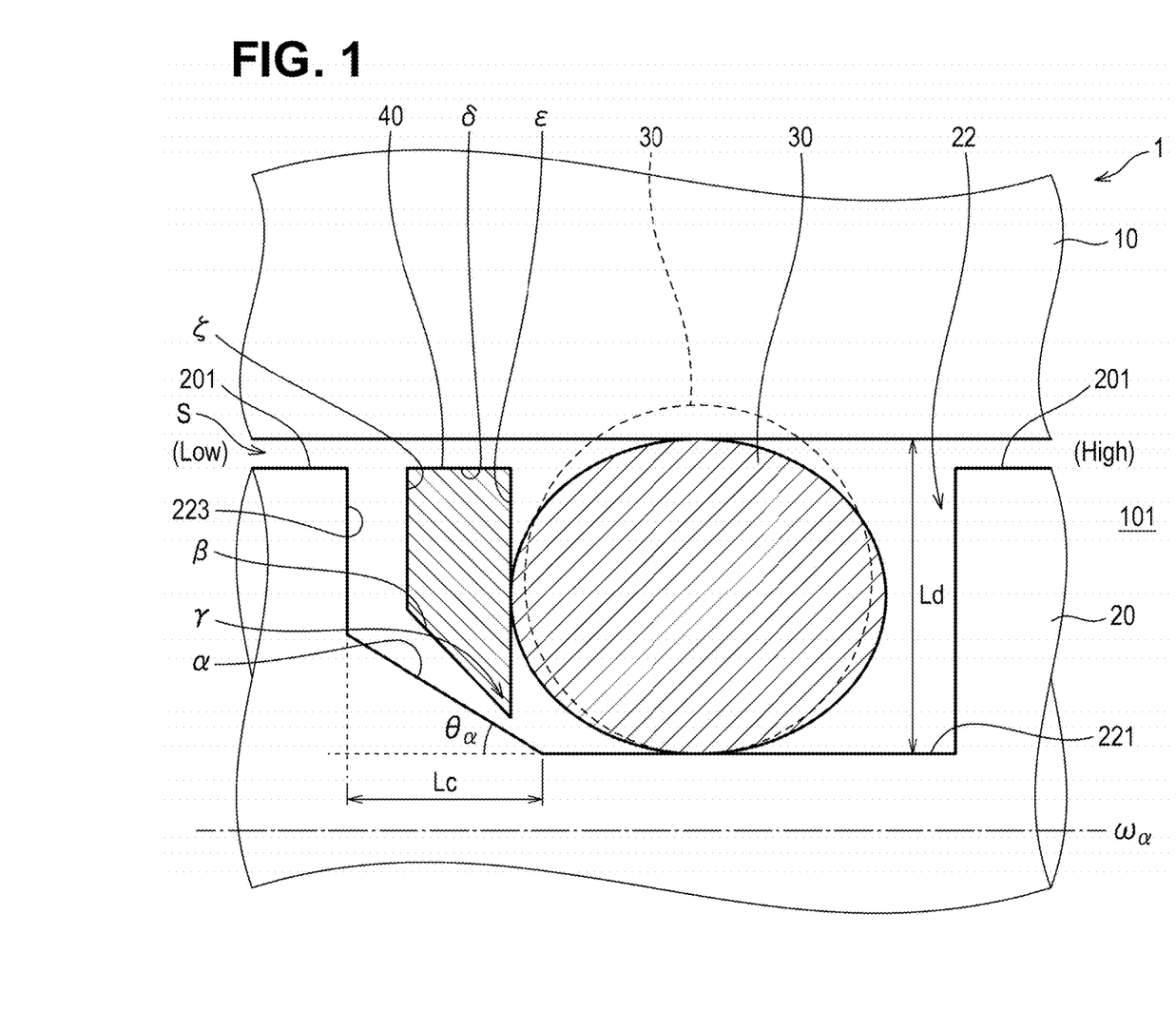
FIG. 1 is a schematic cross-sectional view showing a sealing structure 1 in a preferred embodiment of the invention.

FIG. 1 is a schematic cross-sectional view showing a sealing structure 1 in a preferred embodiment of the invention. More precisely, FIG. 1 is a schematic view of a cross-section through which an axis wo of a shaft 20 passes.

As shown in FIG. 1, the sealing structure 1 of the invention has a housing 10, the shaft 20, a sealing ring 30, and a backup ring 40.

<Housing>

The housing 10 included in the sealing structure 1 of the invention is now described.

The housing 10 has a shaft hole 101 through which the shaft 20 is inserted. Then, the shaft hole 101 is of a type in which the shaft 20 having a columnar shape is fitted into the shaft hole 101 with a slight gap S formed therebetween. Therefore, a cross-section in a direction perpendicular to the longitudinal direction of the shaft hole 101 is circular in shape and the circle has a slightly larger diameter than that of a cross-section of the shaft 20.

A line connecting centers of circular cross-sections of the shaft hole 101 substantially coincides with the axis wo of the shaft 20 to be described later.

The material and the like of the housing 10 are not particularly limited as long as it has a certain strength. Examples of the material of the housing 10 include metal, ceramic, and plastic.

<Shaft>

The shaft 20 included in the sealing structure 1 of the invention is now described.

The shaft 20 has a columnar shape. Therefore, cross-sections perpendicular to the longitudinal direction of the shaft 20 are circular in shape and a line connecting their centers is the axis $\omega_\alpha$. The shaft 20 may rotate about the axis Wo or move in a direction parallel to the axis $\omega_\alpha$ (longitudinal direction).

As described above, the axis $\omega_\alpha$ substantially coincides with the line connecting the centers of the circular cross-sections of the shaft hole 101 in the direction perpendicular to its longitudinal direction.

Further, as shown in FIG. 1, the shaft 20 has a circumferentially continuing annular groove 22 in its outer peripheral surface 201.

The depth and the width of the annular groove 22 differ depending on the size and elasticity of the sealing ring 30 to be used.

A groove bottom 221 of the annular groove 22 may be formed parallel to the axis $\omega_\alpha$ as shown in FIG. 1 but may not be parallel. The groove bottom 221 has, on its low pressure side (Low), a tapered surface α where the distance to the housing 10 is gradually reduced from the high pressure side (High) toward the low pressure side (Low). The tapered surface α is preferably planar as shown in FIG. 1 (linear in FIG. 1).

The tapered surface α has a taper angle $\theta_\alpha$ of 15° to 50°, preferably 20° to 40°, and more preferably 25° to 35°.

When the taper angle is within the above-defined ranges, the sealing structure of the invention has high sealing performance.

The taper angle $\theta_\alpha$ of the tapered surface α shall mean an angle formed between the tapered surface α and the axis $\omega_\alpha$ in a cross-section as in FIG. 1 through which the axis $\omega_\alpha$ of the shaft 20 passes.

The length of the tapered surface α in the annular groove 22 in a direction parallel to the axis $\omega_\alpha$ is denoted by Lc.

The distance from the groove bottom 221 (the portion except the tapered surface α) to the housing 10 in a direction perpendicular to the axis $\omega_\alpha$ is denoted by Ld. In a case where the groove bottom 221 (the portion except the tapered surface α) is not parallel to the axis $\omega_\alpha$, an average value of the distance from the groove bottom 221 (the portion except the tapered surface α) to the housing 10 is used as Ld.

<Sealing Ring>

The sealing ring 30 included in the sealing structure 1 of the invention is now described.

The sealing ring 30 is disposed within the annular groove 22 and is configured to seal the gap S formed between the shaft 20 and the housing 10 in the shaft hole 101.

Figure 2:
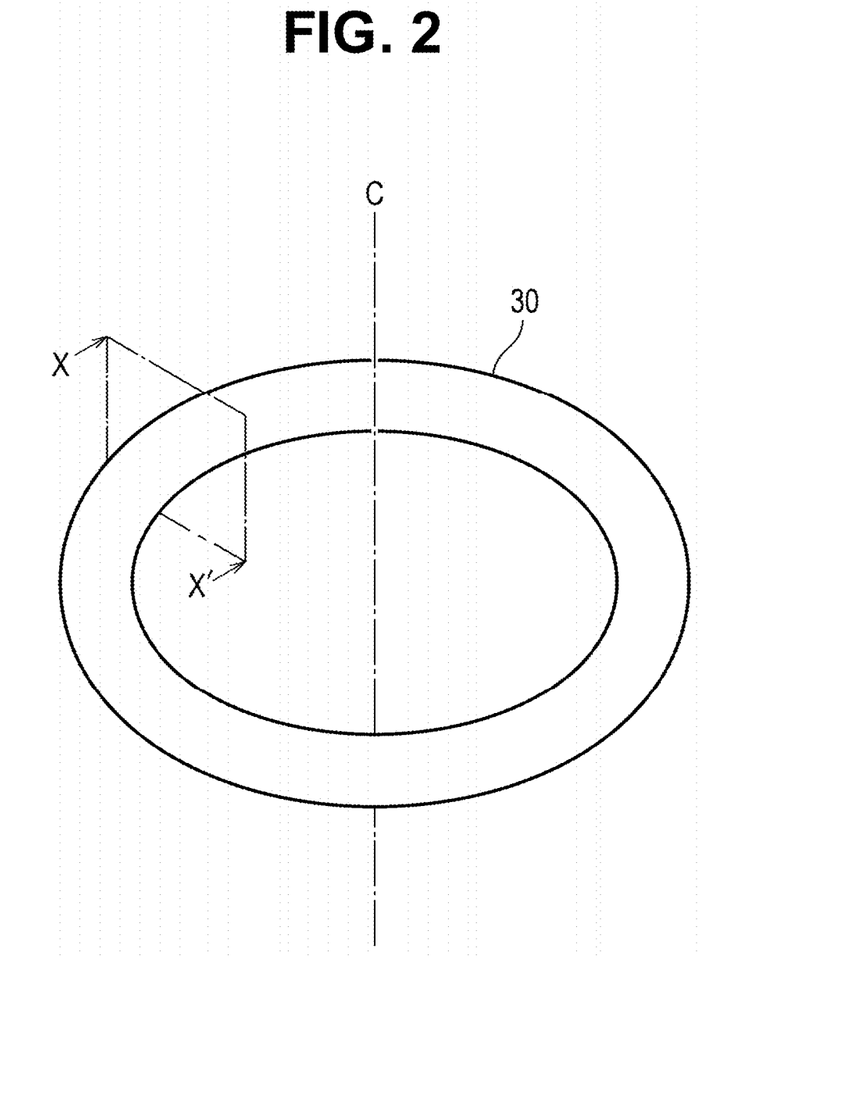
FIG. 2 is a schematic perspective view of a sealing ring before being disposed within an annular groove.

The sealing ring 30 before being disposed within the annular groove 22 has a ring shape as shown in FIG. 2, and a cross-section taken along line X-X' is, for example, circular in shape as shown by a dotted line in FIG. 1. The sealing ring 30 is made of elastic rubber. Therefore, when disposed within the annular groove 22, the sealing ring 30 is sandwiched between the groove bottom 221 and the housing 10 to be deformed into a shape, for example, as shown by a solid line in FIG. 1.

The sealing ring 30 shown in FIG. 1 and FIG. 2 has a circular cross-sectional shape but may have another shape.

The sealing ring 30 has a ring shape as shown in FIG. 2 and its centerline C substantially coincides with the axis $\omega_\alpha$ of the shaft 20. In other words, the sealing ring 30 and the shaft 20 are in principle disposed so as to form concentric circles.

The sealing ring 30 is made of elastic rubber and its material may be NBR, VMQ, EPDM, FKM, or HNBR.

<Backup Ring>

The backup ring 40 included in the sealing structure 1 of the invention is now described.

The backup ring 40 is disposed on the low pressure side (Low) of the sealing ring 30 within the annular groove 22.

The backup ring 40 plays a role in preventing the sealing ring 30 from protruding out of the annular groove 22 due to pressure from the high pressure side (High).

In order to play such a role, the backup ring 40 needs to be made of a hard material having hardness not less than a certain value. Specifically, the backup ring 40 is preferably made of PA, PEEK, POM, PPS, or PTFE, and more preferably PA6 or PEEK.

Figure 3:
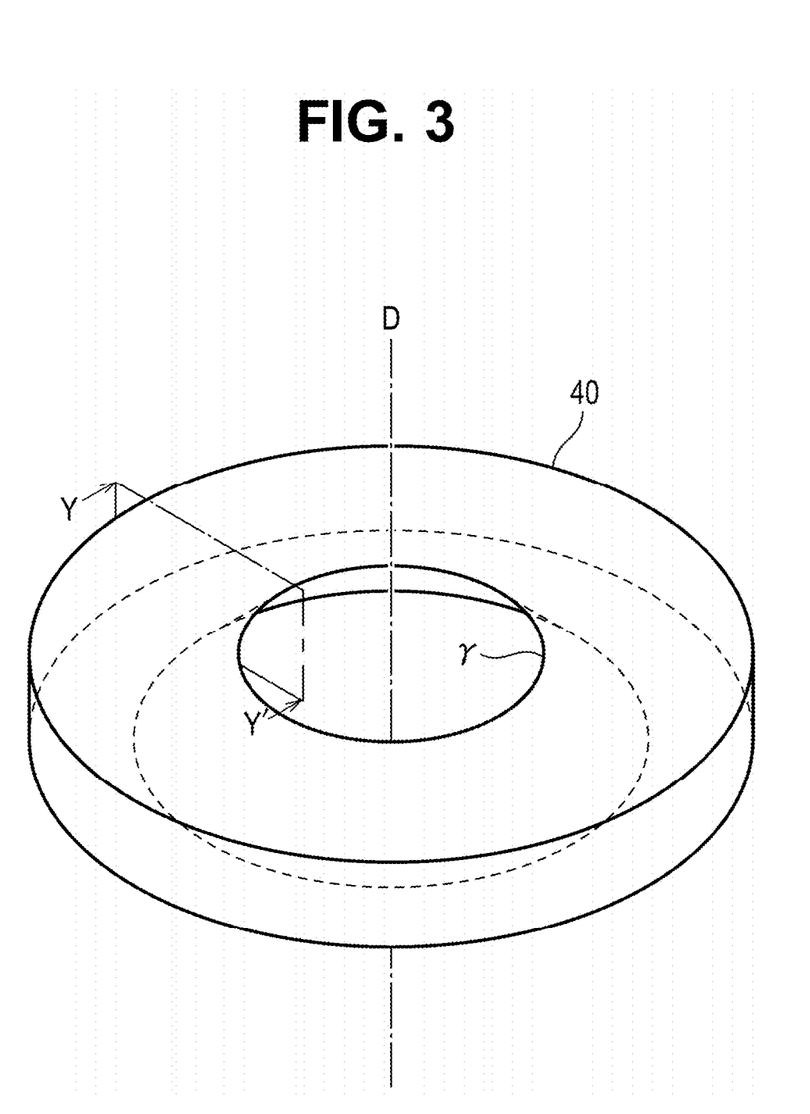
FIG. 3 is a schematic perspective view of a backup ring before being disposed within the annular groove.
Figure 4:
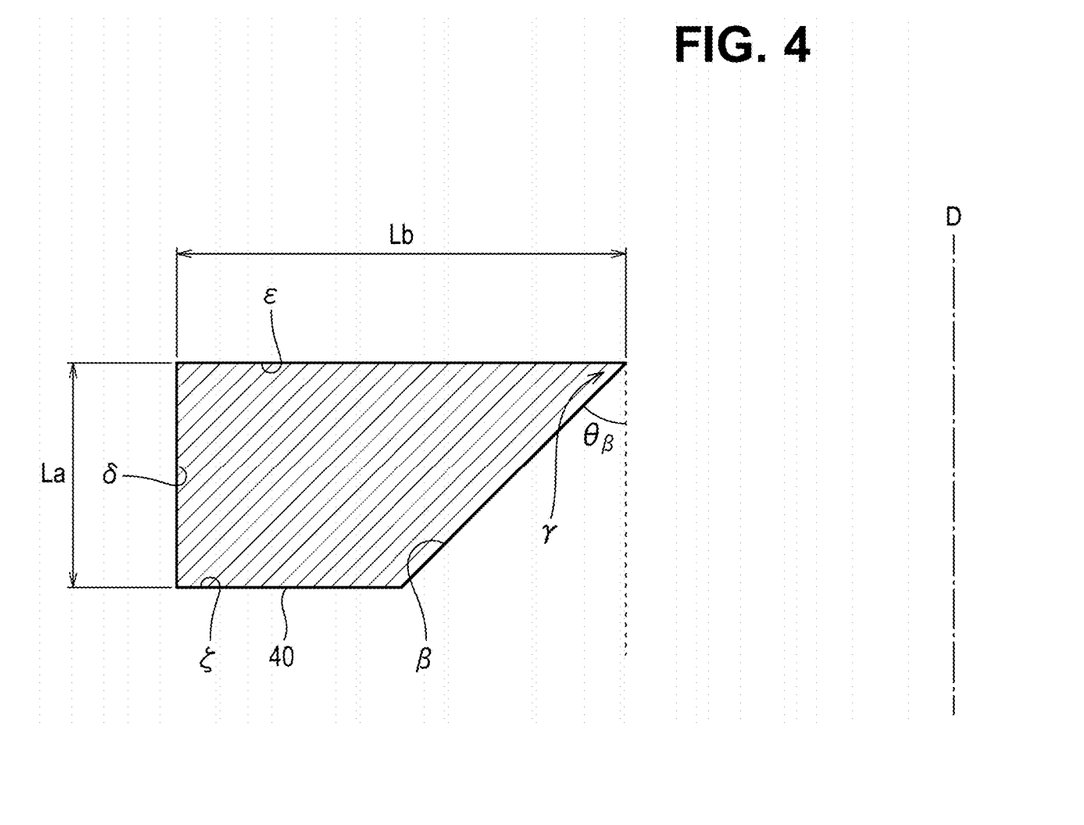
FIG. 4 is a schematic cross-sectional view of the backup ring.

The backup ring 40 has a ring shape as shown in FIG. 3, its centerline D substantially coincides with the axis wo of the shaft 20, and its cross-section taken along line Y-Y' has, as shown in FIG. 1 and FIG. 4, a quadrangular shape, the shape having a tapered surface β as one of its four sides.

The backup ring 40 is disposed so that the tapered surface β faces the tapered surface α which is a part of the groove bottom 221. The tapered surface β is preferably planar as shown in FIG. 1 and FIG. 4 (linear in FIG. 1 and FIG. 4). The taper angle $\theta_\beta$ of the tapered surface β is larger than the taper angle $\theta_\alpha$. In this case, an annular edge portion γ on the high pressure side (High) of the tapered surface β is made slidable in the state of line contact with the tapered surface α.

The taper angle $\theta_\beta$ of the tapered surface β shall mean, as shown in FIG. 4, an angle ($\theta_\beta \leq 90°$) formed between the tapered surface β and the centerline D of the backup ring 40 before being disposed within the annular groove 22.

The cross-section of the backup ring 40 has, as shown in FIG. 1 and FIG. 4, a quadrangular shape, and in a case where a surface δ facing the housing 10 (corresponding to the outer peripheral surface of the ring-shaped backup ring 40) is disposed so as to be parallel to the housing 10 as shown in FIG. 1, a surface ε on the side closer to the sealing ring 30 and/or a surface ζ on the side farther away from the sealing ring 30 which is opposite to the surface ε is preferably perpendicular to the axis $\omega_\alpha$ and the centerline D.

The length of the surface ζ in a direction perpendicular to the axis $\omega_\alpha$ in FIG. 1 is not less than a certain value, and is preferably at least one-fifth as long as that of the surface ζ in the direction perpendicular to the axis $\omega_\alpha$.

The backup ring 40 has a ring shape as shown in FIG. 3 and its centerline D substantially coincides with the centerline C of the sealing ring 30.

The backup ring 40 may have the shape of an endless ring or an open-ended ring, a part of which is cut away. The cutting direction is not particularly limited and cutting may be made, for example, at a right angle to the circumferential direction but bias cutting which is cutting diagonally to the circumferential direction is preferably performed. When the bias cutting is performed, the sealing line is easily kept even if the diameter of the backup ring 40 is increased.

In a cross-section through which the axis $\omega_\alpha$ of the shaft 20 as shown in FIG. 1 or the centerline D of the backup ring 40 as shown in FIG. 4 passes, the length of the backup ring 40 in a direction parallel to the axis $\omega_\alpha$ and the centerline D is denoted by La, and the length of the backup ring 40 in a direction perpendicular to the axis $\omega_\alpha$ and the centerline D is denoted by Lb.

La satisfies La≥0.5 mm.

La is preferably 0.9 mm or more, and more preferably 1.0 mm or more.

La is preferably up to 3.1 mm and may be up to 1.1 mm.

When La is within the above-defined ranges, the backup ring 40 has a high strength.

La/Lb>½ is satisfied.

La/Lb is preferably 0.6 or more, and preferably 0.8 or more.

La/Lb is preferably up to 3.0, and preferably up to 1.5.

When La/Lb is within the above-defined ranges, the backup ring 40 is less likely to topple down in the annular groove 22, thus preventing buckling from occurring.

Lb satisfies Ld>Lb.

In this case, when the backup ring 40 is disposed within the annular groove 22, the annular edge portion γ comes into contact with the tapered surface α. The shaft 20 is less likely to have scratches when the backup ring 40 is disposed within the annular groove 22, and the backup ring 40 is less likely to be compressed in a direction perpendicular to the axis $\omega_\alpha$. The backup ring 40 is more easily attached to the annular groove 22.

Further, $Ld - \{(Lc - La)/\tan(90° - \theta_\alpha)\} \leq Lb$ is satisfied.

In this case, in a state in which the annular edge portion γ of the backup ring 40 is in contact with the tapered surface α and the surface δ of the backup ring 40 is closely attached to the housing 10, a slight gap is formed between the surface ζ of the backup ring 40 on the side farther away from the sealing ring 30 and a surface 223 facing it in the annular groove 22, and the gap can follow during groove deformation under applied pressure.

In the sealing structure 1 of the invention, the internal diameter of the backup ring 40 is preferably larger than the cross-sectional diameter up to the groove bottom 221 of the annular groove 22 (limited to the portion except the tapered surface α). In this case, the backup ring 40 is easily disposed within the annular groove 22, and the annular edge portion γ on the high pressure side (High) of the tapered surface β easily slides on the low pressure side in the state of line contact with the tapered surface α.

The internal diameter of the backup ring 40 is equal to the shortest distance between the centerline D and a point closest to the centerline D in the backup ring 40, i.e., the tip of the annular edge portion γ.

The cross-sectional diameter up to the groove bottom 221 of the annular groove 22 (limited to the portion except the tapered surface α) (diameter on a cross-section perpendicular to the axis $\omega_\alpha$) means the shortest distance between the groove bottom 221 (limited to the portion except the tapered surface α) and the axis $\omega_\alpha$ in FIG. 1. In a case where the groove bottom 221 (the portion except the tapered surface α) is not parallel to the axis $\omega_\alpha$, the cross-sectional diameter shall mean an average value of the distance from the groove bottom 221 (the portion except the tapered surface α) to the axis $\omega_\alpha$.

In the sealing structure of the invention as described above, when the pressure difference between the high pressure side (High) and the low pressure side (Low) is increased, the sealing ring 30 is pressed on the low pressure side (Low). The backup ring 40 is thus pressed on the low pressure side (Low) to move to the low pressure side (Low). Then, the surface δ of the backup ring 40 slides in the state of surface contact with the inner peripheral surface of the shaft hole 101 of the housing 10, and the annular edge portion γ of the backup ring 40 slides substantially in the state of line contact with the tapered surface α. The more the low pressure side (Low) is approached, the more the distance between the housing 10 and the tapered surface α is reduced. Therefore, the more the backup ring 40 moves to the low pressure side (Low), the more the amount of compression made by the housing 10 and the tapered surface α is increased. Therefore, formation of the gap between the backup ring 40 and the housing 10 can be suppressed to prevent a part of the sealing ring 30 from protruding into the gap between the backup ring 40 and the housing 10.

In a case where the shaft 20 is made eccentric, the distance between the shaft 20 and the housing 10 is the smallest at a point in the circumferential direction and is the largest at a position 180° away from the above point. Therefore, when seen on a cross-section through which the axis passes, the backup ring 40 apparently moves in the longitudinal direction of the shaft 20 but the whole of the backup ring 40 does not move parallel to the longitudinal direction of the shaft 20.

Actually, when the shaft 20 is made eccentric, the backup ring 40 is deformed so as to tilt with respect to the axis $\omega_\alpha$ of the shaft 20, and the backup ring 40 apparently moves parallel to the axis $\omega_\alpha$ when seen on the cross-section through which the axis $\omega_\alpha$ passes.

This application claims priority based on Japanese Patent Application No. 2021-184846 filed on Nov. 12, 2021, the entire disclosure of which is incorporated herein by reference.

REFERENCE SIGNS LIST 1 sealing structure of the invention
10 housing
101 shaft hole
20 shaft
201 outer peripheral surface
22 annular groove
221 groove bottom
223 outer peripheral side surface of the annular groove
30 sealing ring
40 backup ring
60 shaft
70 housing
71 annular groove
71a tapered surface
75 annular groove
100 sealing ring
120 inner peripheral edge
150 sealing ring
200 backup ring
300 backup ring

The invention claimed is:

1. A sealed structure comprising:
a column-shaped shaft having a circumferentially continuing annular groove in its outer peripheral surface;
a housing having a shaft hole through which the shaft is inserted;
a sealing ring made of elastic rubber which is disposed within the annular groove and is configured to seal a gap between the shaft and the housing in the shaft hole; and
a backup ring made of a hard material which is disposed on a low pressure side of the sealing ring within the annular groove and is configured to prevent the sealing ring from protruding out of the annular groove due to pressure from a high pressure side;
wherein:
a groove bottom of the annular groove has, on its low pressure side, a tapered surface α where a distance to the housing is gradually reduced from the high pressure side toward the low pressure side, and the tapered surface α has a taper angle $\theta_\alpha$ of 15° to 50°,
the backup ring has a tapered surface β which faces the tapered surface α, a taper angle $\theta_\beta$ of the tapered surface β is larger than the taper angle $\theta_\alpha$, and an annular edge portion on the high pressure side of the tapered surface β is configured to be slidable in a state of line contact with the tapered surface α, and
in a cross-section through which an axis $\omega_\alpha$ of the shaft passes, a length of the backup ring in a direction parallel to the axis $\omega_\alpha$ is denoted by La, a length in a direction perpendicular thereto is denoted by Lb, a length of the tapered surface α in the annular groove in a direction parallel to the axis $\omega_\alpha$ is denoted by Lc, and a distance between the groove bottom of the annular groove and the housing is denoted by Ld, following formulas are satisfied:

$La \geq 0.5$ mm, $La/Lb > \frac{1}{2}$, $Ld > Lb$, and $Ld - \{(Lc-La)/\tan(90°-\theta_\alpha)\} \leq Lb$.

2. The sealing structure according to claim 1, wherein an internal diameter of the backup ring is larger than a cross-sectional diameter of a portion of the groove bottom of the annular groove that extends from an end of the tapered surface.

3. The sealing structure according to claim 1, wherein an outer peripheral side surface of the annular groove has a length, in the direction perpendicular to the direction parallel to the axis $\omega_\alpha$, that is larger than a length of an immediately oppositely facing surface of the backup ring in the direction perpendicular.

4. The sealing structure according to claim 1, wherein the formulas are satisfied such that another gap is maintained between an outer peripheral side surface of the annular groove and an immediately oppositely facing surface of the backup ring during groove deformation under applied pressure.

* * * * *